Aug. 13, 1968　　　　E. TLAKER　　　　3,396,563
METHOD OF FORMING PROFILED OBJECTS
Filed Oct. 21, 1965　　　　　　　　　　3 Sheets-Sheet 1

C-C

B-B

A-A

D-D

INVENTOR.
ERICH TLAKER
BY
HIS ATTORNEY

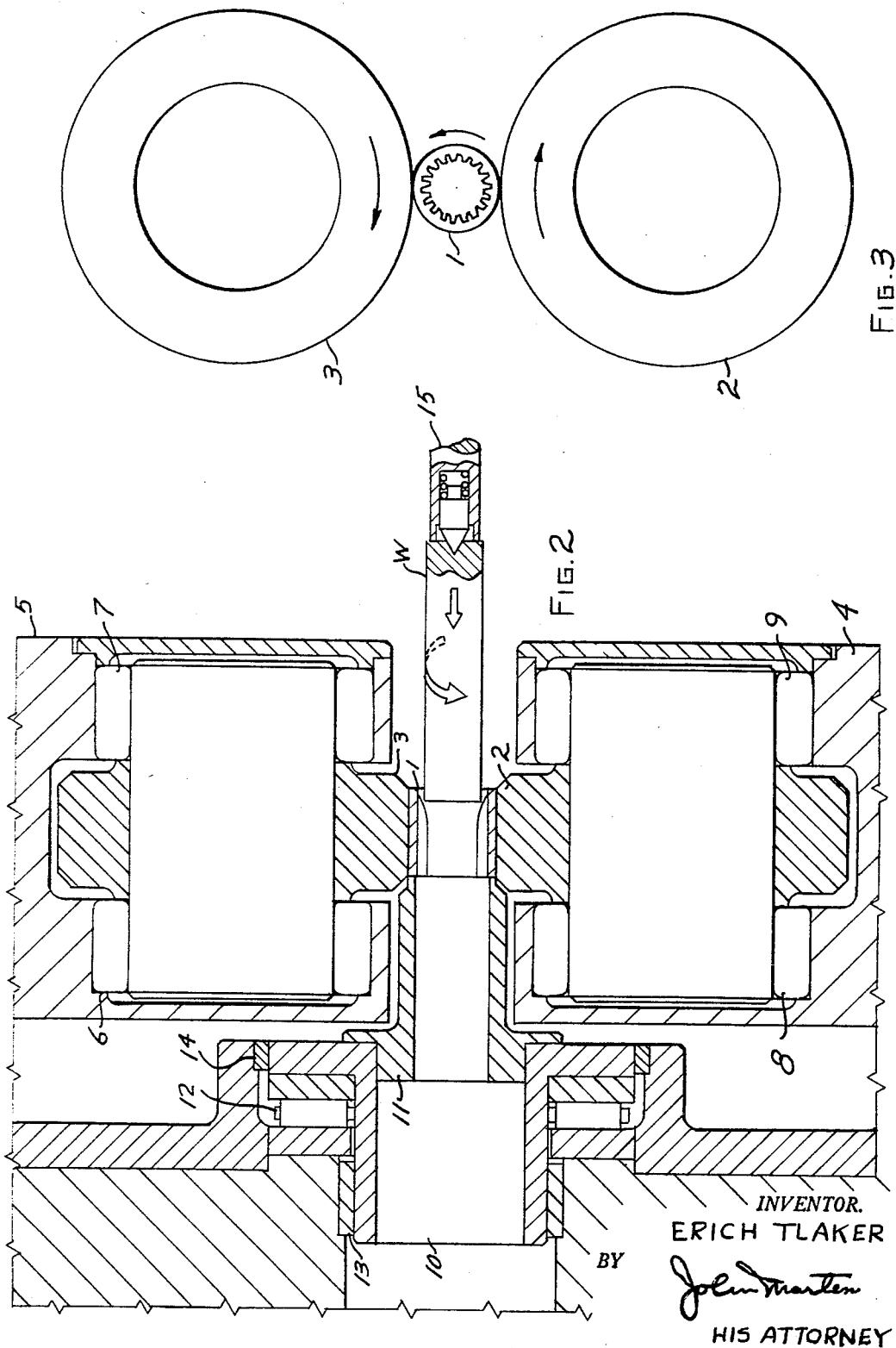

Aug. 13, 1968     E. TLAKER     3,396,563
METHOD OF FORMING PROFILED OBJECTS

Filed Oct. 21, 1965     3 Sheets-Sheet 3

INVENTOR.
ERICH TLAKER
BY John Morton
HIS ATTORNEY

# United States Patent Office 3,396,563
Patented Aug. 13, 1968

3,396,563
METHOD OF FORMING PROFILED OBJECTS
Erich Tlaker, Springfield, Vt., assignor to The Fellows Gear Shaper Company, Springfield, Vt., a corporation of Vermont
Filed Oct. 21, 1965, Ser. No. 499,176
7 Claims. (Cl. 72—118)

ABSTRACT OF THE DISCLOSURE

A method of forming profiled work pieces by displacing the work piece material by flow utilizing a flex-ring having a profile which is the complement of the profile to be formed. The flex-ring is elastically flexed inwardly in limited zones as the work piece is fed therethrough in timed relation to the flexing of the ring so that the work piece is progressively formed by material flow to the desired profile.

---

The present invention is concerned with the production of profiled elements by means of material flow or displacement rather than by material removal. The method of the present invention is particularly concerned with the production of externally profiled elements. The method herein disclosed is applicable particularly to the production of gears, pinions and similarly toothed parts and profiled shapes.

Work pieces of the type obtained by the present method have been previously formed by methods involving the removal of metal involving cutting, grinding and the like. Such methods, as is well known, involve the use of more material than necessary to achieve the final article. Also such methods involve the removal of chips and their disposal.

Work pieces of the type herein concerned have been obtained by material displacement methods such as rolling, where a tool conjugate to the work must be employed, and this rolling method frequently results in flowing the material in directions which affect the final shape adversely. In such conjugate rolling the flanks of the profiled shape are flowed outwardly and this results in seaming at the tip of the shape.

The present invention employs a tool called a flex-ring which ring has an internally profiled shape which is the counterpart or the complement of the shape of the work piece. This ring is flexed inwardly in limited zones as the work is being fed therethrough and the flexure inwardly on the work results in a progressive forming of the desired shape on the work.

A primary object of the invention is to provide a method which will produce a desired profile on a work piece by material displacement and without the adverse effect of previous methods of obtaining profiled shapes.

A second object of the invention is to provide an externally profiled part by means of employing a flexible ring which is flexed in limited zones and distributing said limited zones circumferentially of the ring as the work piece is being formed.

Another object of the invention is to provide apparatus to be used in a method of cold forming a work piece without the application of heat during the forming operation to produce an externally profiled part.

Another object of the invention is to cold form an externally toothed part such as a gear or the like in a continuous process by the application of forces in limited circumferential zones of the work while moving said zones relatively circumferentially of the work and so applying these forces as to obtain the desired shape on the work with no undesirable flow characteristics.

Other objects of the present invention will be apparent to those skilled in the art from the following specifications and drawings in which like reference characters designate the same elements wherever they appear.

In the drawings:

FIGURE 2 is a partial section of a machine which can be used to carry out the method of the present invention.

FIGURE 3 is an end view showing the rolls and flex-ring of the apparatus of FIGURE 2.

As shown in FIGURES 1, 1A through 1D, a flex-ring 1 is employed in carrying out the method of the present invention. This flex-ring 1 is made of a suitable metal which is capable of being elastically deformed by the application of forces thereto in limited zones spaced circumferentially about the ring.

Internally the flex-ring 1 is formed with a plurality of profiles which are complemental to the shape to be given to the work piece W. For purposes of illustration the formation of a gear-like work piece is depicted.

The axial shape of the profiles of the flex-ring 1 progressively deepens as they proceed from the end of the flex-ring 1 where the work enters to the exit end. At A—A of FIGURE 1A it is seen that the profile of the flex-ring 1 is of comparatively little depth. At B—B of FIGURE 1B the profile has progressively deepened until at C—C of FIGURE 1C the profile has reached full depth of the profile to be formed on the work.

Figure 1:
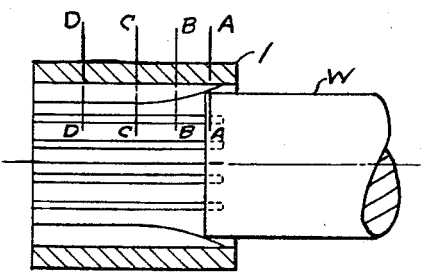
FIGURE 1 is a section showing a work piece about to enter the working portion of the flex-ring.
Figure 1C:
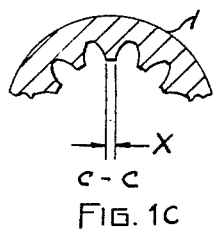
FIGURE 1C shows a partial section at C—C of FIGURE 1.
Figure 1B:
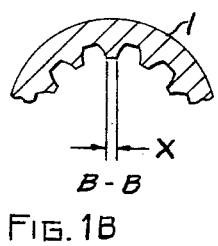
FIGURE 1B shows a partial section at B—B of FIGURE 1.
Figure 1A:
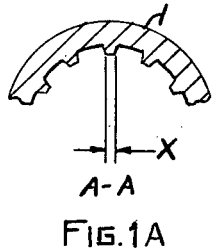
FIGURE 1A shows a partial section at A—A of FIGURE 1.
Figure 1D:
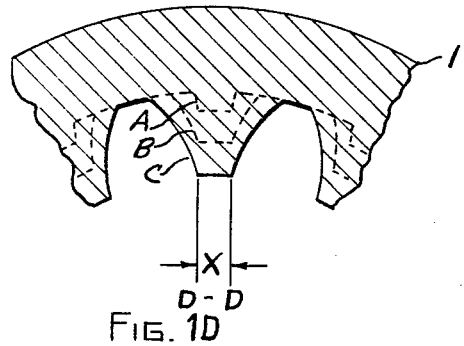
FIGURE 1D shows a partial enlarged section at D—D of FIGURE 1 and also illustrates in broken lines the shape of the flex-ring profile comparatively at A—A, B—B and C—C of FIGURE 1.

The gradual deepening of the profiles is further illustrated in FIGURE 1D where the line A shows the profile at the entering end, the line B the profile at approximately half way to full depth and the line C the profile at full depth.

As shown in FIGURE 1D this full depth of profile continues through section D—D to the exit end of the flex-ring 1.

In order to obtain the desired and proper flow of the material of the work piece W, the top of the forming profile is of uniform width from the entering to the exit end of the flex-ring 1 as shown by the dimension X in FIGURES 1A through 1D.

Figure 4:
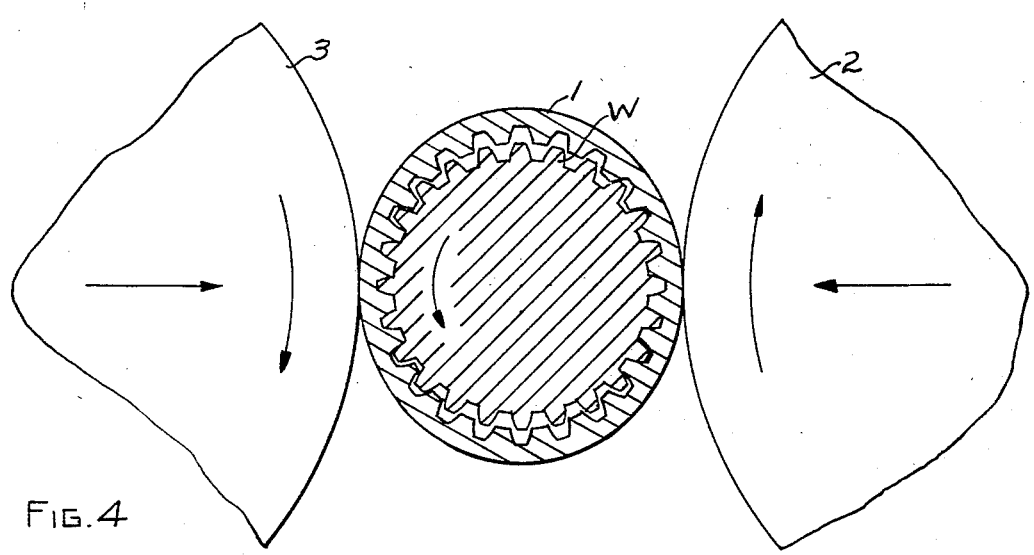
FIGURE 4 is a greatly enlarged and exaggerated partial view of FIGURE 3 showing the action of the flex-ring in forming the desired profile on the work.

Shown in FIGURES 2, 3 and 4 is one type of apparatus which may be employed to carry out the method of the present invention.

Two or more rolls 2 and 3 act on the circumference of the flex-ring 1 to deflect the ring inwardly to apply pressure to the work piece W. These rolls 2 and 3 are carried on slides 4 and 5 which are fed inwardly by any appropriate means as is well known in the art, such as feed screws or hydraulic means if desired. The method of applying this infeed to the rolls is not a part of the present invention.

As shown in FIGURE 2 the rolls 2 and 3 are mounted in bearings 6, 7, 8 and 9 which are carried in slides 4 and 5. The rolls 2 and 3 are free to rotate in these bearings upon contact with the work W.

The flex-ring 1 is held against axial movement relative to rolls 2 and 3 by a thrust member 10 acting through member 11 against the end of the flex-ring 1.

The member 10 acts against thrust bearing 12 and is rotatable in radial bearings 13 and 14.

The work piece W is fed into and rotated by any suitable mechanism. As shown in FIGURE 2, this consists of a work driver 15 which forces the work W into the flex-ring 1 while simultaneously rotating the work. The rotation of the work W causes the flex-ring 1 to rotate and the rotation of the flex-ring 1 causes the freely mounted rolls 2 and 3 to also rotate.

If desired, it should be apparent that instead of rotating the work positively, one or both of the rolls 2 and 3 may be positively rotated, in which case the rolls impart rotation to the flex-ring 1 and the work W so as to obtain the desired deflection of the flex-ring 1 in the necessary localized circumferentially displaced areas.

It will be apparent that as the flex-ring 1 rotates between the rolls 2 and 3 adjacent areas of the outer circumference of the ring pass through the deflection area of the deflection rolls 2 and 3 and as these areas pass through the deflected zone pressure will be applied in limited zones to the work piece W causing the material to flow radially to gradually conform the work to the internal profile of the flex-ring 1.

The radial outward flow of the material of the work W will occur in the deflection zones and in these locations the work will be flowed in a direction to conform to the profiles of the flex-ring 1 and to be complemental to the flex-ring 1. Flow will occur only where pressure is applied; that is, in the deflection zone.

The pressures applied by the rolls 2 and 3 to the flex-ring 1 are sufficient in magnitude to exceed the yield strength of the work material in the localized deflection zones and in localized areas and this causes a flow of plastic material which progresses in incremental steps both circumferentially and axially as the work is fed into the flex-ring 1. This flow continues until the final finished profile is produced on the work.

The incremental feeding is dependent upon the speed of rotation through the deflection zones and the amount of deflection of the flex-ring 1. The application of force in localized deflection zones or areas of the flex-ring circumference avoids stressing of the entire cross section of the work thus allowing the work material to flow radially outward as the axial feed and the rotation progress.

Of course, it should be apparent that the work blank can be positioned in the forming portion of the flex-ring 1 without any feeding of the work through the ring, but the progressive forming of the work will occur by the limited zone application of the forming forces as the work and flex-ring are rotated into application of the forming forces.

FIGURE 4 shows the formation of a work piece in apparatus such as disclosed in FIGURE 2. In FIGURE 4 the deflection of the flex-ring 1 is shown in greatly exaggerated form. It will be seeen from this FIGURE 4 that the material of the work piece W is forced radially outward into the spaces of the portions of the flex-ring 1 which are being forced inwardly by the pressure exerted radially inward by the force of the rolls 2 and 3 acting on the flex-ring 1 in the localized pressure zones.

Figure 5:
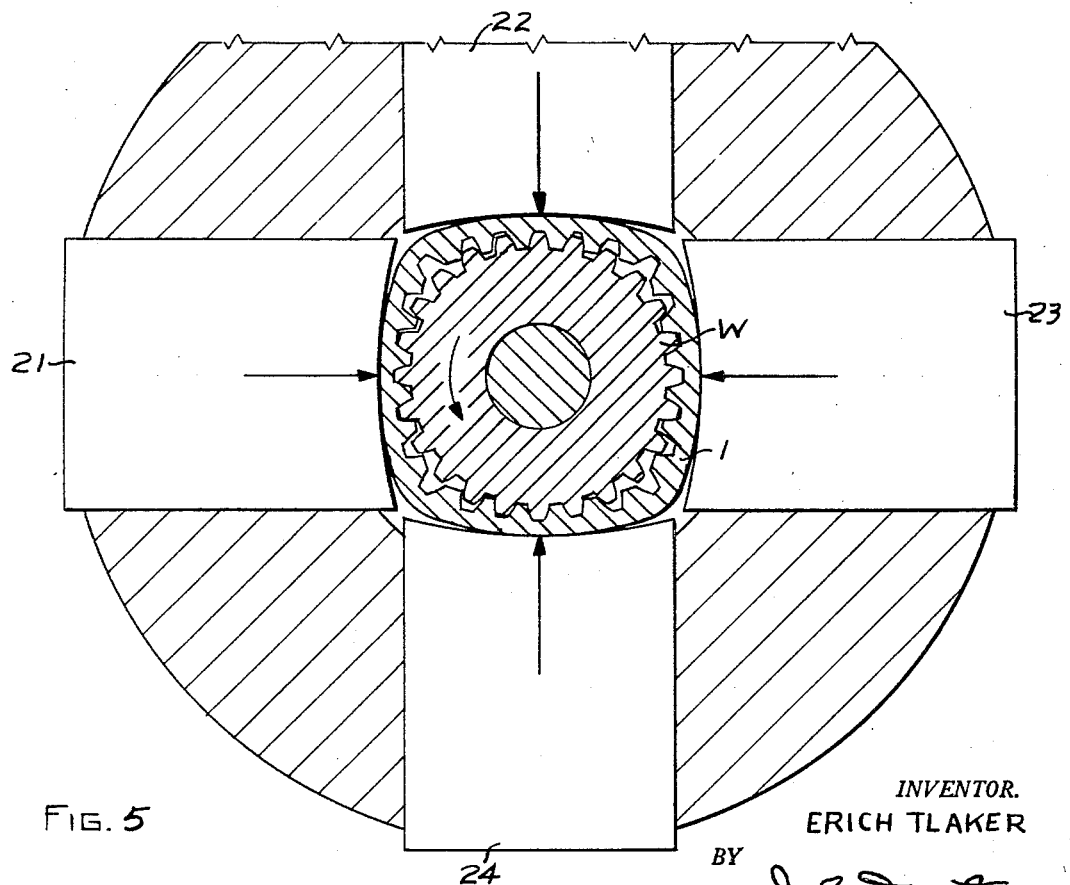
FIGURE 5 shows a different apparatus which can be employed to carry out the method of the present invention.

FIGURE 5 illustrates a different form of mechanism than that of FIGURE 2 for carrying out the method of the present invention. In this type of apparatus a plurality of dies 21, 22, 23 and 24 are intermittently forced radially inwardly to exert pressure on the flex-ring 1 which in turn acts on the work piece W to cause radial flow of the material in the same manner as the apparatus of FIGURE 2. In FIGURE 5 the deflection of the flex-ring 1 is also shown as greatly exaggerated to more clearly illustrate the action of the flex-ring 1 on the work W.

The four dies 21, 22, 23 and 24 are intermittently pressed inward by any well known mechanism. This could be mechanism of the type employed and commonly used in rotary swaging machines or any similar eccentric or cam-operated mechanisms used for radial forming operations. In between the intermittent strokes of the dies the work is fed axially into the dies and also rotated by any appropriate mechanism so as to bring a different localized circumferential area of the flex-ring 1 into position to be acted on by the dies and to be deflected so as to exert pressure on the work.

In the apparatus of both FIGURE 2 and FIGURE 5, the rotation of the work may be omitted. However, if the work is not rotated it is necessary to rotate the rolls 2 and 3 or the dies 21, 22, 23 and 24 about the work since a relative rotation between work and the force applying means must be obtained in order to deflect the flex-ring 1 in localized circumferentially displaced zones about the work piece W.

The accuracy of the flex-ring 1 is directly reflected in the accuracy of the work since the work is the complement of the contour of the flex-ring. Since no generating action is involved nor any conjugate action between work and tool, the work obtained by the present invention is the true complement or negative of the flex-ring.

Moreover, due to the fact that the dimension X as shown in FIGURES 1A through 1D is constant throughout the axial length of the flex-ring, the outside diameter of the work piece tooth is rigidly controlled throughout the forming operation and no flaking or seaming will occur on the tip of the tooth due to any undesirable outward material flow.

If helical gear teeth or helically disposed elements are to be formed on the work piece, it is merely necessary to have the corresponding elements on the flex-ring similarly helically disposed and the desired shape will be obtained on the work since the flex-ring produces its exact complement or counterpart.

What I claim and desire to secure by Letters Patent is:

1. In a method of forming gear teeth and similar profiled workpieces by displacing material by flow, the steps of feeding a work blank into a flex-ring having a profile thereon which is the complement of the desired profiled shape to be formed on the work and which flex-ring is capable of being elastically deflected by means of forces acting on localized areas of its circumference, applying forces to said flex-ring in limited localized areas of the circumference of said flex-ring to urge said flex-ring into contact with the work blank, relatively feeding said work blank axially through said flex-ring in timed relation to the application of said forces and rotating the position of application of said forces relatively to the axis of said work blank so that said forces are incrementally displaced about the circumference of said flex-ring during the axial feed of said workpiece through said flex-ring.

2. In a method as defined in claim 1 in which said flex-ring is formed with a multiplicity of longitudinally extending ribs having said profile formed thereon, said ribs being of gradually increasing depth from the entrance side of said flex-ring to adjacent its exit end and feeding said work blank through said flex-ring at such a rate that the desired profile is obtained on the work blank in gradually occurring form timed with the feeding of said work blank in relation to the flex-ring.

3. In a method as defined in claim 2 in which the position of application of said forces is rotated by the step of rotating the work blank while in contact with the flex-ring so as to simultaneously rotate the flex-ring and the work blank.

4. In a method as defined in claim 3 in which the forces are applied to said flex-ring intermittently and imparting said rotation to said work blank during periods when said forces are not acting on said flex-ring.

5. In a method of forming gear teeth and similar profiled workpieces by displacing material by flow, the steps of feeding a work blank into a flex-ring having a working portion thereon, the profile of which is the complement of the desired profiled shape to be formed on the work and which flex-ring is capable of being elastically deflected by means of forces acting on localized areas of its circumference, applying forces to said flex-ring in limited localized areas of the circumference of said flex-ring to urge said flex-ring into contact with the work, feeding said work blank into the working portion of said flex-ring to subject said flex-ring and said workpiece to the application of said forces and rotating the position of the application of said forces relatively to the axis of said work blank so that said forces are incrementally displaced about the circumference of said flex-ring during the time that said work blank is located in the working portion of said flex-ring.

6. In a method as defined in claim 5 in which the forces are applied intermittently to said flex-ring and correspondingly to said work blank and in which the rotation of said work blank relative to the position of application of said forces is obtained by imparting rotation to said flex-ring and work blank while said forces are not acting on said flex-ring.

7. In a method of forming gear teeth and similar profiled workpieces by displacing material by flow, the steps of positioning a work blank into a flex-ring having a working portion thereon, the profile of which is the complement of the desired profiled shape to be formed on the work and which flex-ring is capable of being elastically deflected by means of forces acting on localized areas of its circumference, applying forces to said flex-ring in limited localized areas of the circumference of said flex-ring to urge said flex-ring into contact with the work, positioning said work blank into the working portion of said flex-ring to subject said flex-ring and said workpiece to the application of said forces and rotating the position of the application of said forces relatively to the axis of said work blank so that said forces are incrementally displaced about the circumference of said flex-ring during the time that said work blank is located in the working portion of said flex-ring.

References Cited
UNITED STATES PATENTS

| 946,631 | 1/1910 | Dallou | 72—77 |
| 3,039,334 | 6/1962 | Kohler | 72—103 |
| 3,174,319 | 3/1965 | Koyana et al. | 72—102 |

CHARLES W. LANHAM, *Primary Examiner.*

R. D. GRETE, *Assistant Examiner.*